United States Patent [19]
Stearns

[11] Patent Number: 5,320,479
[45] Date of Patent: Jun. 14, 1994

[54] PACKET FEEDING AND STACKING SYSTEM

[75] Inventor: Ralph A. Stearns, Bozrah, Conn.

[73] Assignee: Spirol International Corporation, Danielson, Conn.

[21] Appl. No.: 939,079

[22] Filed: Sep. 1, 1992

[51] Int. Cl.⁵ .................... B65G 57/08; B65G 57/112
[52] U.S. Cl. ................. 414/794.6; 414/792.7; 221/298; 221/300
[58] Field of Search .......... 414/792.7, 789, 794.5, 414/794.6; 198/463.6, 524; 221/176, 296, 298, 300

[56] References Cited

U.S. PATENT DOCUMENTS

| | | | |
|---|---|---|---|
| 1,367,081 | 2/1921 | Olson | 198/463.6 |
| 1,518,557 | 12/1924 | Boettcher | 414/789 |
| 1,708,670 | 3/1929 | Heath | 198/463.6 |
| 2,720,322 | 10/1955 | Locke | 414/794.5 |
| 2,937,788 | 5/1960 | Darsie | 198/463.6 |
| 3,772,972 | 11/1973 | Dutro et al. | 414/794.5 |
| 3,850,289 | 11/1974 | Behr et al. | 198/524 |
| 4,171,129 | 10/1979 | Daley et al. | 271/6 |
| 4,193,726 | 3/1980 | Spengler | 414/792 |
| 4,261,456 | 4/1981 | Scarpa et al. | 198/463.6 |
| 4,279,555 | 7/1981 | Rydell | 414/83 |
| 4,463,944 | 8/1984 | Grantham | 414/794.5 |
| 4,842,669 | 6/1989 | Considine | 52/745.19 |

FOREIGN PATENT DOCUMENTS

| | | |
|---|---|---|
| 3730307 | 3/1989 | Fed. Rep. of Germany ... 198/463.6 |
| 4128 | 1/1987 | Japan ............... 198/463.6 |
| 1225757 | 4/1986 | U.S.S.R. ............ 198/463.6 |
| 1523939 | 9/1978 | United Kingdom . |

OTHER PUBLICATIONS

Fleischauer, "Stacking Sheets Automatically", *Automation*, Apr. 1986, pp. 106-109.

*Primary Examiner*—Michael S. Huppert
*Assistant Examiner*—Gregory A. Morse
*Attorney, Agent, or Firm*—Chilton, Alix & Van Kirk

[57] ABSTRACT

A packet feeder system having a track extending between a packet feeder and the packet receiving end of a magazine includes a discharge end of the track that is adjustably positionable relative to the receiving end of the magazine. Appropriate sensors are provided for detecting the position of the uppermost packet within the magazine relative to the discharge end of the track and a suitable control unit is responsive to the sensing device for controlling the adjustable position of the discharge end of the track. In addition, the track is provided with sequenced gating for controlling movement of the packets along the track. The gating includes a plurality of barriers spaced along the length of the track by a distance slightly greater than the length of the packets. The control unit is effective to sequentially move the barriers into and out of a packet restraining position in a sequence whereby adjacent barriers are prevented from being out of their restraining positions simultaneously.

14 Claims, 3 Drawing Sheets

PACKET FEEDING AND STACKING SYSTEM

The present invention relates generally to a feeding and stacking system and is more particularly concerned with a new and improved packet feeder system for the orderly delivery of packets from a source to a magazine and the stacking of those packets in the magazine.

BACKGROUND OF THE INVENTION

The packet feeder system of the present invention relates primarily to a system wherein the packets are fed to the magazine by gravity using a track oriented at an appropriate angle for conveying the packets from a feeder source to the uppermost end of the magazine. Frequently, systems of this type use a vibratory bowl feeder as the source of randomly accumulated packets for delivery to the magazine. The vibratory feeder has the capacity to receive and store the packets and, as a consequence of vibration, to move or drive the packets up a delivery path along the inside wall of the bowl. As the packets climb the path, typically they are oriented end to end, single file. Misoriented packets tend to fall back into the bowl. As the packets approach the exit of the bowl, the geometry of the path, guide rails or other devices can be employed to restrict excessively bunched packets, causing them also to fall back into the bowl so that, at the output of the bowl, the packets preferably move in a single file oriented end to end. The packets exit the bowl and drop onto the surface of a gravity feed track that is inclined downwardly so that the packets slide away from the bowl, generally at a rate faster than that at which they are fed from the bowl. This increased rate tends to separate the packets from one another during delivery to the magazine.

As the packets exit the gravity track, the leading end of the packet lands on top of the uppermost or last packet to enter the magazine. This, of course, stops the forward motion of the packet and the tail or trailing end of the packet falls onto the uppermost packet stacked in the magazine. If the packet entering the magazine falls slightly short, it glances off the top of the uppermost packet and strikes the far wall of the magazine which typically is perpendicular to the path of travel along the gravity track. The packet thus entering the magazine strikes the wall directly or after glancing off the top uppermost packet in the stack and lands in an appropriately ordered and oriented position within the magazine.

Under certain circumstances, the removal of the lowermost packets from the bottom of the magazine may exceed the rate at which the packets are delivered to the uppermost portion of the magazine, thus providing a significant gap between the uppermost packet in the magazine and the packet being delivered by the gravity track. This excess room may provide a sufficient distance so the trailing edge of the packet entering the magazine rapidly falls into the magazine as the leading edge thereof strikes the far wall of the magazine. This can cause significant misorientation of the delivered packet since the packet is free to flip and loose proper orientation before landing on top of the stack within the magazine.

It has also been found that as the packets are delivered from the feeder to the gravity track some packets are stacked one on top of another in either a fully overlapping or partially overlapping (shingled) array. Where the packets are fully overlapping, they act as a unit during their travel along the track and entry into the magazine and no significant misorientation is experienced. However, if the packets are shingled, the result is a significant misorientation within the magazine. Bridges form and prevent the packets from falling neatly into the pile, or the trailing edge of the leading packet is pushed up and over by the second packet rather than being allowed to fall down neatly into the stack within the magazine. As mentioned, when the leading edge of the packet impacts on the far wall of the magazine, the trailing edge of the packet tends to fall downwardly and glances off the top of the uppermost packet in the stack. If the leading edge of the partially overlapping trailing packet is below the trailing edge of the leading packet, the sudden downward motion of the first packet can force the leading edge of the second packet down also so that the second packet actually flips over and proper stacking is completely disrupted.

SUMMARY OF THE INVENTION

It is an object of the present invention to provide a new and improved packet feeder system that eliminates the aforementioned stacking orientation problems within the magazine due to any significant gap between the delivery end of the gravity track and the uppermost packet in the magazine or due to the partially overlapping orientation of the packets as they move along the gravity track. The new and improved system of the present invention provides for the orderly stacking of packets within a magazine following the gravity delivery of the packets to the magazine from a randomly piled source. Included in this feature is the provision for a relatively simple, yet effective, control mechanism for properly orienting the delivery end of the track relative to the magazine and also for controlling the movement of the packets along the gravity track to assure proper orientation of the packets and therefore orderly stacking within the magazine.

Other features and advantages will be in part obvious and part pointed out more in detail hereinafter.

These and related objects and advantages are obtained by providing a packet feeder system having a track extending between a packet feeder and the packet receiving end of a magazine wherein the discharge end of the track is adjustably positionable relative to the receiving end of the magazine. The system includes appropriate sensors for detecting the position of the uppermost packet within the magazine relative to the discharge end of the track and a suitable control unit responsive to the sensing device for controlling the adjustable position of the discharge end of the track. In addition, the track is provided with sequenced gating for controlling movement of the packets along the track. The gating includes a plurality of barriers spaced along the length of the track by a distance slightly greater than the length of the packets. The control unit is effective to sequentially move the barriers into and out of a packet restraining position in a sequence whereby adjacent barriers are prevented from being out of their restraining positions simultaneously.

A better understanding of the objects, advantages, features, properties and relationships of the invention will be obtained from the following detailed description of the apparatus shown therein and the accompanying drawing that sets forth an illustrative embodiment indicative of the way in which the principles of the invention are employed.

DESCRIPTION OF A PREFERRED EMBODIMENT

Figure 1:
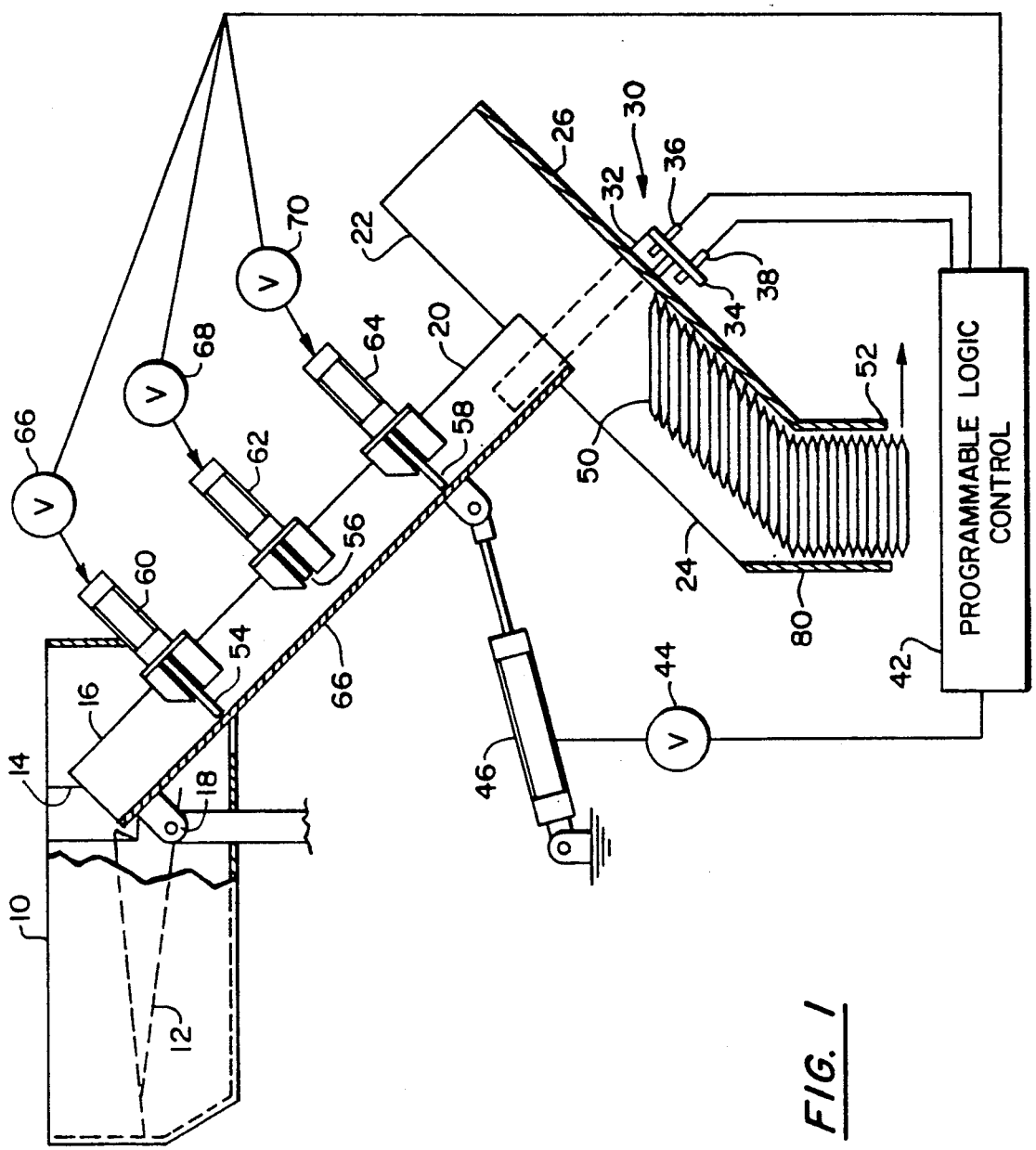
FIG. 1 is a schematic view of a packet feeder system incorporating the features of the present invention.

Referring now to the drawings in greater detail wherein like reference numerals indicate like parts throughout the several figures, the system is shown as having a suitable source for a random array of packets, such as the vibratory bowl feeder 10. As mentioned, the vibratory bowl 10 has a relatively large storage capacity and is provided with an inclined track 12 along the interior of the bowl whereby the vibratory motion of the bowl moves or drives the packets or other materials within the bowl along the inclined path toward an appropriate exit port 14 for the bowl. As the packets climb the path 12, it is narrowed, or is otherwise constricted or configured, so that misoriented or excess packets fall back into the bowl or, as a result of barriers or air jets, are pushed away from the inclined path leading to the exit port.

An inclined track 16 is mounted at the exit port 14 of the vibratory bowl 10 by means of an appropriate pivot mount 18, so that the track extends downwardly at an angle of approximately 45 degrees. As will be appreciated, the degree of inclination of the track may vary significantly, by as much as 20-25 degrees, from the optimum 45 degree angle, although typically the angle will vary by no more than 10 degrees on either side of the 45 degree slope. As will also be appreciated, the length of the track 16 may vary considerably depending on the type of packets or other materials being delivered by the system.

The delivery or discharge end 20 of the track 16 is positioned adjacent the packet receiving end 22 of the magazine 24. As shown, the packet receiving end 22 of the magazine is preferably angularly oriented so that it is substantially perpendicular to the normal discharge orientation of the gravity track 16. The cross-sectional configuration of both the track 16 and the magazine 24 may vary significantly to accommodate the particular packet size being handled by the system. The far wall 26 of the magazine 24, that is, the wall opposite the discharge end 20 of the track, preferably is a transparent member in the system 20 described herein in order to accommodate a packet monitoring optical sensor array 30.

As shown in FIG. 1, a sensor-supporting arm 32 extends from the discharge end 20 of the track 16 and is fixably mounted thereto for movement with the track. In the particular embodiment illustrated, the sensor support 32 is in the form of an L-shaped mounting member having a base portion 34 positioned beyond and in overlapping relationship with the rear wall 26 of the magazine. A pair of fiber optic sensors 36, 38 are mounted on the base portion 34 in vertically spaced positions and are directed toward the transparent rear wall 26 of the magazine so as to sense the presence or absence of packets stacked within the magazine 22. The sensors 36, 38 preferably are reflective in operation and emit a beam of light that bounces off any packets present within the magazine. The reflected beam is sensed by the sensor causing an appropriate activation of a transistor switch located within a programmable logic control unit 42. The vertical spacing between the sensors 36, 38 is approximately the thickness of two or three packets, although the exact spacing is not critical so long as the operation thereof will provide the result described herein.

The control unit 42 responsive to the sensors provides for the control of a valve such as a solenoid valve 44, which in turn controls operation of a pneumatic cylinder 46 pivotally connected to the gravity track 16 at a location adjacent its discharge end 20. It has been found in accordance with the present invention that a four-way, three-position directional control solenoid valve operates effectively to control the operation of the pneumatic cylinder 46, which in turn is operative to pivotally drive the track 16 in either an upward or downward direction relative to the packet receiving end 22 of the magazine 24.

In accordance with the preferred mode of the system, a transistor within the sensors acts as a gate or switch connected across the input terminals of the programmable logic controller 42. As will be appreciated, if the upper sensor 36 senses a packet within the track, the track is raised by the pneumatic cylinder 46. Of course, if the lower sensor 38 does not sense any packets within the track, the cylinder 46 lowers the discharge end 20 of the track, thereby increasing the slope or angle thereof, with the track angle being adjusted until the lower sensor 38 senses a packet and the upper sensor 36 does not sense any packet within the magazine. Under those conditions, the solenoid is operatively positioned so as to terminate any airflow through the valve 44, thus maintaining the pneumatic cylinder 46 at its appropriately controlled condition. When either of the sensors move out of the indicated control position, that is, when the upper sensor 36 senses a packet or the lower sensor 38 senses the absence of a packet, the solenoid 44 is reenergized to either raise or lower the angle of the track in response to the particular signal transmitted by the sensors. Thus, as will be appreciated, with the two sensors mounted relatively close to each other, one vertically disposed relative to the other, the discharge end of the track can be closely targeted to the uppermost packet 50 within the magazine for accurate positioning of the track and accurate delivery of packets conveyed along the track to the magazine for orderly stacking therein. Depending on the rate of removal of the packets from the bottom 52 of the magazine 24, the slope of the track may be constantly adjusted in response to the two sensors.

As mentioned, the packets enter and slide down the track under the influence of gravity. When doing so, they tend to slide under or over one another and shingling or partial overlapping of the packets frequently occurs. If substantially total overlap of the packets is present (see FIG. 2b) at the time the packets exit the discharge end of the track, typically no problem will occur. This is because the multiple packets can exit the track as a unit and stack neatly on top of the pile within the magazine without losing their orientation. Problems occur when the packets exit the track in only a partially overlapped condition. To eliminate that situation, the system of the present invention provides an appropriate gating array spaced along the length of the track. The gating includes a plurality of pneumatic packet barriers which, as shown in FIG. 1, can conveniently be mounted above the track 16 so that the extendable barrier members 54, 56, 58 of each respective pneumatic cylinder 60, 62, 64 extend into the track and approach the sliding surface 66 of the track when moved into their extended positions. These barriers, when extended, act as positive stops against which the packets slide and abruptly stop. As the packets stop against the barriers, their motion becomes controlled in a manner similar to the situation when stacked pairs of packets strike the far wall of the magazine. The leading ends of the packets become squared up against the barriers, much as a deck of cards would be squared up by tapping its end against a table. In the specific embodiment illustrated in FIG. 1, the three pneumatic cylinder operated barriers 54, 56 and 58 are provided in spaced array along the length of the track. These barriers each are spaced by a distance slightly more than the length of any single packet. The exact spacing may vary. However, the distance between each barrier should be significantly less than the length of two full packets.

The same or a separate control unit can be employed to control the operation of the gating system. As can be appreciated, the control unit 42 is preferably interconnected with the vertically spaced sensor units 36, 38 so that when neither the upper or lower sensing units detect a packet within the magazine, the gating will prevent actuation of the barrier system until the gravity track has been moved to its appropriate position. When in that position, the control unit 42 may not only permit actuation of the gating system, but also through the individual valves 66, 68, 70 associated with the respective pneumatic pistons 60, 62, 64, control the timing and sequence of operation of the individual pneumatically actuated barriers 54, 56 and 58.

Figure 2A:
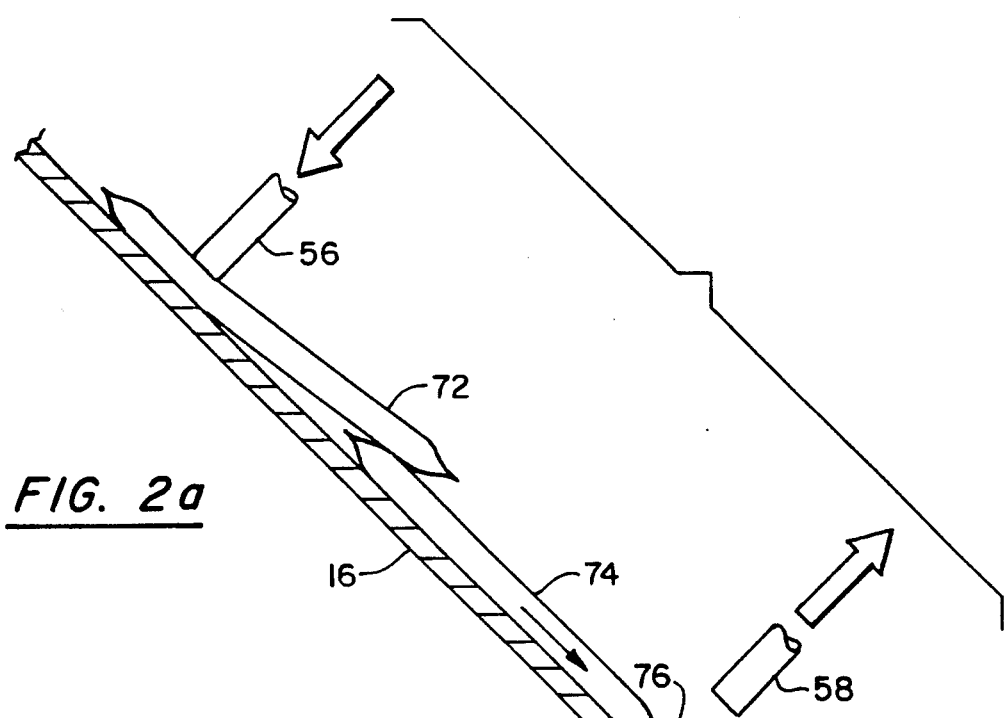
FIGS. 2a and 2b are schematic illustrations of the manner in which the gating associated with the gravity track controls the deliver of packets moving therealong.
Figure 2B:
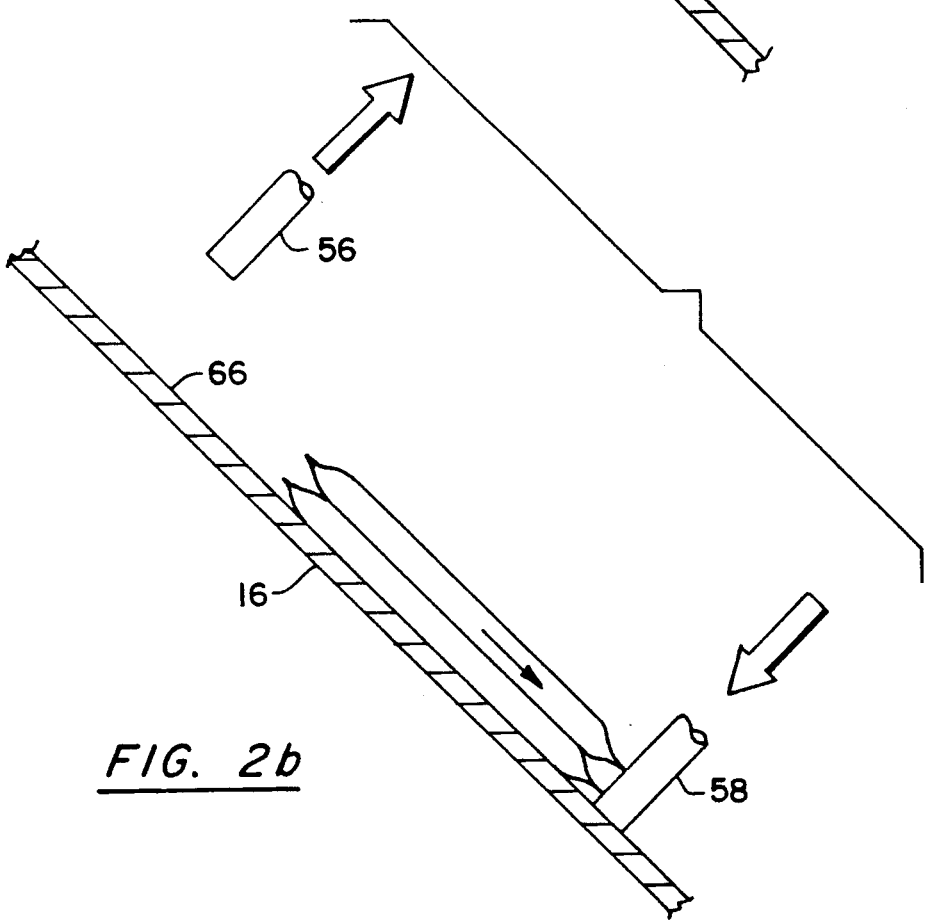

As best understood by referring to FIGS. 2a and b, shingled packets 72, 74 traveling along the gravity track will come into contact with one of the barriers, such as barrier 58, which has been moved to its extended or barrier position. As the leading edge 76 of the first packet 74 engages the barrier 58, it is brought to an abrupt stop and any trailing shingled packet may either continue its travel or also stop so as to maintain its shingled condition. Where the second packet continues to travel so that the two packets are in substantially fully overlying condition, as depicted in FIG. 2b, release by the barrier 58 will permit them to enter the magazine in an orderly fashion. However, if the trailing packet 72 does not move significantly when the first packet 74 stops, actuation of a barrier 56 upstream from the barrier 58 preventing movement of the first packet 74 will, upon actuation, engage the trailing packet 72 and restrain further movement thereof as depicted in FIG. 2a. Thereafter, release of the lead packet 74 by the downstream barrier 58 will permit only the lead packet 74 to continue its progress along the track 16, while the trailing packet 72 is held by the restrained engagement of the upstream barrier 56.

Figure 3:
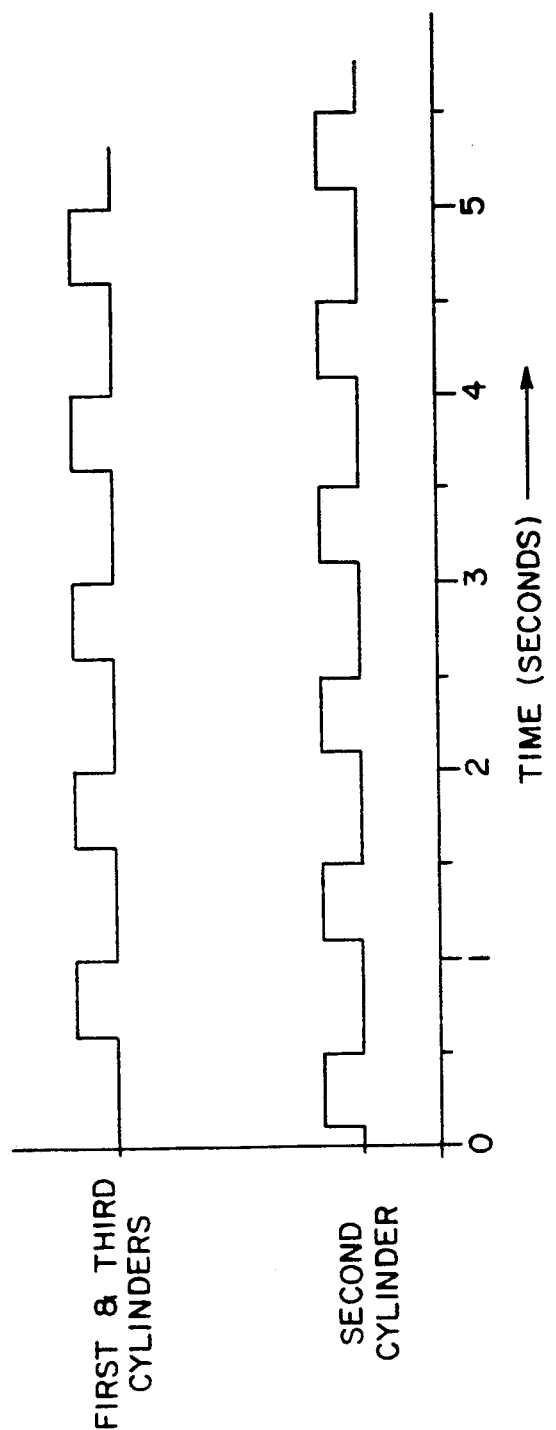
FIG. 3 illustrates a timing sequence for a tri-gated system embodying the features of the present invention.

As indicated in FIG. 3, the timing sequence for the barriers 54, 56, 58 is controlled so that all barriers are in their extended positions simultaneously and adjacent barriers such as 54 and 56 or 56 and 58, are never in their withdrawn condition simultaneously. There is an overlap in the timing when all barriers are in their extended or packet restraining condition. Consequently, the pneumatically controlled barriers are timed so that after the packets are released by one barrier, they slide down and strike the next barrier. By repeating this process, pairs of shingled packets either are separated or are drawn into a more fully overlying condition so that they cleanly stack in the magazine upon exiting the discharge end of the track. If the shingling is only slight or a third packet is partially shingled with a stacked pair, it will be restrained by the upstream barrier. As mentioned, proper spacing of the multiple barriers and timing of the movement thereof avoids any significant problem with respect to unduly large stacks of packets traveling along the track. Any trailing packet held by an upstream barrier is not released until the lower barrier has been extended to its barrier position and will be effective to restrain the upstream packet once it is released by the upstream barrier.

It will, of course, be appreciated that the timing cycle set forth in FIG. 3 may be adjusted or varied as may the number of barriers. However, by the use of these "give and go" pneumatic actuated barriers, the packets are either separated completely or neatly stacked in groups and allowed to pass through the system without jamming. It should, of course, be kept in mind that the location of the barriers must be in sufficient proximity so that the actuation of a barrier will stop the motion of the packets along the track by either pinching them against the floor of the track or by blocking their path.

In the specific embodiment illustrated, the cycles of the three barriers are timed so that each cylinder along the track is fully extended before the adjacent cylinder is retracted. In this manner, the packets are not allowed to pass through two adjacent barrier positions without being stopped. As pairs of shingled packets impact against an extended barrier, the ends of the packets are squared up in the manner described. If the packets fail to square up, they are separated by the restraining action of the barriers before the most advanced packet is released to slide down the track. The trailing packet is pinched and held in position by the upstream barrier. Before the trailing packet is released, the downstream barrier is moved to its extended barrier position, thus preventing the packet from recatching the advanced packet which has been released by the downstream barrier and shingling with it again.

As shown in FIG. 1, the magazine 24 is a storage device that holds the packets in a neat stack until they are removed from the magazine at the bottom 52 thereof. The lower section 80 of the magazine 24 preferably is vertically oriented and simply takes the form of a simple rectangular tube, the internal dimensions of which are just slightly in excess of the vertical dimensions of the packets when stacked. The upper portion 22 of the magazine integrally connected to the vertical section 80 is, as mentioned, preferably sloped at an angle of 45 degrees relative to the lower section 80 and is arrayed substantially perpendicular to the typical orientation of the moveable track 16. Since the packets have a tendency to roll over against the confining wall, the slope of the upper portion of the magazine is arranged to prevent such rollover.

While the preferred embodiment of the invention has been set forth for purposes of illustration, it will be apparent to persons skilled in the art that various modifications, adaptations and variation of the foregoing specific disclosure can be made without departing from the spirit and scope of the teachings of the present invention.

I claim:

1. In a system for the orderly delivery of packets from a source to a magazine and the subsequent stacking thereof in the magazine comprising a packet feeder, a magazine for stacking the packets therein and a track extending between the feeder and a packet-receiving end of the magazine for conveying packets therebetween and delivering the packets in condition for orderly stacking, the combination wherein the track provides for conveying packets to the magazine by gravity feed and the track is provided with a discharge end that is adjustably positionable relative to the receiving end of the magazine, said system including sensing means for detecting the position of the uppermost packet in the magazine relative to the discharge end of the track and control means responsive to the sensing means for controlling the adjustable position of the discharge end of the track, said system including gating associated with the track for controlling movement of the packets along the track toward the magazine.

2. The system of claim 1 wherein the control means includes a drive member operatively associated with the discharge end of the track for adjusting the position thereof and a programmable control unit for receiving a signal from the sensing means and controlling the operation of the drive member in response thereto.

3. The system of claim 1 wherein the sensing means includes a plurality of optical sensors.

4. The system of claim 1 wherein the sensing means is fixedly mounted relative to the discharge end of the track for movement therewith.

5. The system of claim 1 wherein the sensing means includes a pair of optical sensors vertically spaced adjacent the magazine for sensing the presence or absence of packets at spaced locations in the magazine.

6. The system of claim 1 wherein the track is hingedly mounted to allow pivotal movement of the discharge end thereof, the control means including drive means operatively connected to the track for pivotally raising and lowering the discharge end thereof in response to a signal from the sensing means.

7. In a system for the orderly delivery of packets from a source to a magazine and the subsequent stacking thereof in the magazine comprising a packet feeder, a magazine for stacking the packets therein and a track extending between the feeder and a packet-receiving end of the magazine for conveying packets therebetween and delivering the packets in condition for orderly stacking, the combination wherein the track includes gating for controlling movement of the packets toward the magazine, the gating having a plurality of barriers spaced along the length of the track for movement into and out of a packet-restraining position, and wherein the track is provided with a discharge end that is adjustably positionable relative to the receiving end of the magazine, said system including sensing means for detecting the position of the uppermost packet in the magazine relative to the discharge end of the track and control means responsive to the sensing means for controlling the adjustable position of the discharge end of the track.

8. The system of claim 7 wherein the barriers are spaced along the length of the track by a distance greater than the length of the packets and barrier control means for sequentially moving the barriers into and out of a packet-restraining position whereby barriers next to each other are prevented from being out of the packet-restraining position simultaneously.

9. In a system for the orderly delivery of packets from a source to a magazine and the stacking thereof in the magazine, the combination comprising a packet-conveying track for conveying packets to the magazine and sequenced gating associated with the track for controlling movement of the packets along the track, the gating including a plurality of barriers spaced along the length of the track by a distance greater than the length of the packets and control means for sequentially moving the barriers into and out of a packet-restraining position whereby barriers next to each other are prevented from being simultaneously out of their packet-restraining positions, the system including sensing means for detecting the position of the uppermost packet in the magazine relative to the discharge end of the track and controlling actuation of the gating control means.

10. The system of claim 9 wherein the gating includes at least three barriers and individually operated actuators for each barrier.

11. The system of claim 9 wherein the gating includes at least three barriers and the control means operates to move alternate barriers out of their packet-restraining position simultaneously.

12. The system of claim 9 wherein the track provides for conveying packets to the magazine by gravity feed.

13. The system of claim 9 wherein the sensing means include a plurality of optical sensors.

14. The system of claim 9 wherein the track is provided with a discharge end that is adjustably positionable relative to the receiving end of the magazine, said system including sensing means for detecting the position of the uppermost packet in the magazine relative to the discharge of the track and a sensor-responsive control unit for controlling the adjustable position of the discharge end of the track, said control unit including a drive member operatively associated with the discharge end of the track for adjusting the position thereof and a programmable controller for receiving a signal from the sensing means and controlling the operation of the drive member in response thereto.

* * * * *